(12) United States Patent
Yu et al.

(10) Patent No.: US 8,949,745 B2
(45) Date of Patent: Feb. 3, 2015

(54) DEVICE AND METHOD FOR SELECTION OF OPTIONS BY MOTION GESTURES

(75) Inventors: Eugene Yu, Okemos, MI (US); Jun Yu, Zhejiang (CN); Guojun Shao, Jinhua (CN)

(73) Assignee: Konntech Inc., Okemos, MI (US)

( * ) Notice: Subject to any disclaimer, the term of this patent is extended or adjusted under 35 U.S.C. 154(b) by 46 days.

(21) Appl. No.: 13/449,782

(22) Filed: Apr. 18, 2012

(65) Prior Publication Data
US 2013/0104090 A1    Apr. 25, 2013

Related U.S. Application Data

(60) Provisional application No. 61/627,945, filed on Oct. 21, 2011.

(51) Int. Cl.
| | |
|---|---|
| G06F 3/033 | (2013.01) |
| G06F 1/16 | (2006.01) |
| G06F 3/0487 | (2013.01) |
| G06F 3/0482 | (2013.01) |
| H04M 1/725 | (2006.01) |

(52) U.S. Cl.
CPC ........... *G06F 1/1694* (2013.01); *G06F 3/0487* (2013.01); *G06F 3/0482* (2013.01); *H04M 1/72519* (2013.01); *H04M 2250/12* (2013.01)
USPC .......................................... 715/863; 715/865

(58) Field of Classification Search
CPC ..................................................... G06F 1/1694
USPC ......................................................... 715/863
See application file for complete search history.

(56) References Cited

U.S. PATENT DOCUMENTS

| | | | |
|---|---|---|---|
| 5,821,508 A * | 10/1998 | Willard | 235/51 |
| 6,573,883 B1 * | 6/2003 | Bartlett | 345/156 |
| 6,834,249 B2 | 12/2004 | Orchard | |
| 6,978,127 B1 * | 12/2005 | Bulthuis et al. | 455/412.1 |
| 7,230,605 B2 | 6/2007 | Rekimoto et al. | |
| 7,365,736 B2 | 4/2008 | Marvit et al. | |
| 7,365,737 B2 | 4/2008 | Marvit et al. | |
| 7,679,604 B2 | 3/2010 | Uhlik et al. | |
| 7,903,084 B2 | 3/2011 | Marvit et al. | |
| 7,990,365 B2 | 8/2011 | Marvit et al. | |

(Continued)

OTHER PUBLICATIONS

Scrap104, "[Wii] Everybody Votes Channel", uploaded May 10, 2008, http://www.youtube.com/watch?v=0iD26eOuSY0.*
Nintendo, "Wii Operations Manual System Setup", posted Sep. 30, 2007, pp. 26 and 29, http://www.nintendo.com/consumer/downloads/WiiOpMn_setup.pdf.*
Brown et al., "Shake2Talk: Muiltimodal Messaging for Interpersonal Communication", HAID 2007, LNCS 4813, pp. 44-55, 2007.

(Continued)

*Primary Examiner* — William Bashore
*Assistant Examiner* — Daniel Rodriguez
(74) *Attorney, Agent, or Firm* — Banner & Witcoff, Ltd.

(57) ABSTRACT

A method for selection of an option on a device is provided where the device is enabled for option selection through motion gestures by a user. The method comprises providing at least one option for a first input request and announcing the first input request and at least one option of the first input request. A first motion gesture is detected, and the device determines whether the first motion gesture corresponds to a positive selection or a negative selection, wherein a control module of the device determines whether the first motion gesture meets a threshold for a positive gesture selection or a negative gesture selection. The device advances to a second option and announces the second option upon the determination of a negative selection as the first motion gesture. The selected option for the first input request is stored in a memory of the device after a positive selection.

16 Claims, 7 Drawing Sheets

(56) References Cited

U.S. PATENT DOCUMENTS

| | | |
|---|---|---|
| 8,047,436 B2 | 11/2011 | Earl |
| 2006/0061545 A1 | 3/2006 | Hughes et al. |
| 2006/0279532 A1 | 12/2006 | Olszewski et al. |
| 2007/0146321 A1 | 6/2007 | Sohn et al. |
| 2007/0188450 A1 | 8/2007 | Hernandez et al. |
| 2008/0174550 A1* | 7/2008 | Laurila et al. ............ 345/158 |
| 2009/0262074 A1 | 10/2009 | Nasiri et al. |
| 2009/0265671 A1* | 10/2009 | Sachs et al. ............ 715/863 |
| 2009/0303204 A1 | 12/2009 | Nasiri et al. |
| 2010/0167795 A1* | 7/2010 | Huang ............ 455/567 |
| 2010/0311485 A1* | 12/2010 | Ritter et al. ............ 463/9 |
| 2011/0043443 A1 | 2/2011 | Kawano et al. |
| 2011/0044501 A1 | 2/2011 | Tu et al. |
| 2011/0087523 A1* | 4/2011 | Earl ............ 705/12 |
| 2012/0174043 A1* | 7/2012 | Queru ............ 715/863 |
| 2012/0311508 A1* | 12/2012 | Fleizach ............ 715/863 |
| 2013/0080471 A1* | 3/2013 | Forte et al. ............ 707/785 |

OTHER PUBLICATIONS

Ghiani et al., "Exploiting RFIDs and Tilt-Based Interaction for Mobile Museum Guides Accessible to Visoin-Impaired Users", ICCHP 2008, LNCS 5105, pp. 1070-1077, 2008.

Ghiani et al., "Vibrotactile Feedback as an Orientation Aid for Blind Users of Mobile Guides", MobileHC1 2008, Sep. 2-5, 2008, Amsterdam, the Netherlands, pp. 431-434.

Ruiz et al., "User-Defined Motion Gestures for Mobile Interaction", CHI 2011—Session: Mid-air Pointing & Gestures, May 7-12, 2011, Vancouver, BC, Canada, pp. 197-206.

IEEE Information Theory Society Newsletter, vol. 53, No. 4, Dec. 2003, The Shannon Lecture, Hidden Markov Models and the Baum-Welch Algorithm, pp. 1, 10-13.

Baum et al., "A Maximization Technique Occurring in the Statistical Analysis of Probabilistic Functions of Markov Chains", The Annals of Mathematical Statistics, 1970, vol. 41, No. 1, pp. 164-171.

* cited by examiner

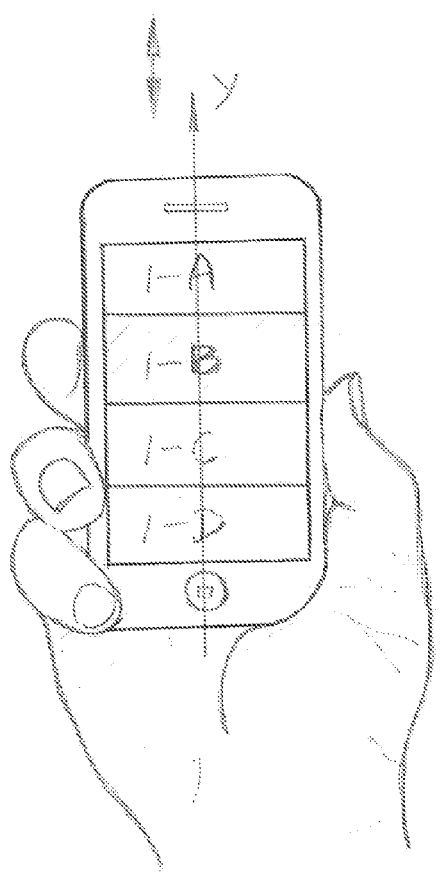
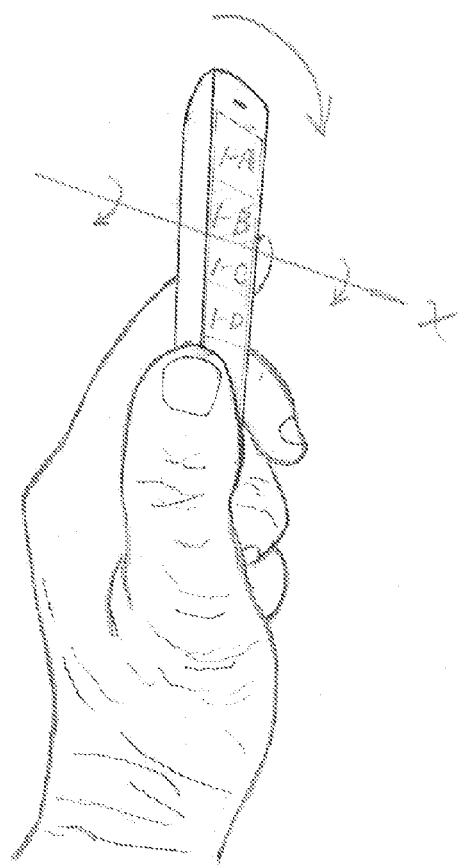
Figure 4
Figure 5

DEVICE AND METHOD FOR SELECTION OF OPTIONS BY MOTION GESTURES

CROSS-REFERENCE TO RELATED APPLICATION

This application claims priority to U.S. Provisional Patent Application 61/627,945 filed Oct. 21, 2011, which is incorporated herein by reference.

FIELD OF ART

The disclosure relates to the field of voting or survey devices and methods, and more particularly to a device and method which enables a user to select an option using a motion gesture.

BACKGROUND

Currently, systems are available which allow for voting in elections via the Internet. These systems have the capability to deliver the election ballot over the Internet to overseas voters such as military personnel stationed abroad. Through these online systems, the overseas voter is able to select the candidate for whom they would like to vote. Since these systems typically require that the voter be able to read the ballot and candidates on a display screen, visually impaired users are unable to vote without assistance.

SUMMARY

The embodiments of the invention described herein enable a user to select an option and navigate through an input request form, for example, an election ballot or a survey without viewing the displayed options by performing motion gestures using a device.

In accordance with an embodiment of the method for selection of an option on a device, wherein the device is enabled for option selection through motion gestures by a user. The device provides at least one option for a first input request and announces the first input request and at least one option of the first input request. The device detects a first motion gesture and determines whether the first motion gesture corresponds to a positive selection or a negative selection, wherein a control module of the voting device determines whether the first motion gesture meets a threshold for a positive gesture selection or a negative gesture selection. When the device determines that the first motion gesture is a negative selection, the device advances to a second option and announces the second option.

In accordance with another embodiment of the method, the device may prompt the user to confirm the selection of a candidate upon the determination of a positive gesture selection as the first motion gesture. The device detects a second motion gesture and determines whether the second motion gesture corresponds to a positive selection or a negative selection by determining whether the second motion gesture meets a threshold for a positive gesture selection or a negative gesture selection.

In accordance with an embodiment of the device enabled for option selection by a user, the voting comprises a motion sensor configured to detect a motion gesture, and a control module configured to select an option in a first input request by determining whether a first motion gesture detected by the motion sensor corresponds to a positive selection or a negative selection by comparing the first motion gesture to a threshold for a positive gesture selection or a negative gesture selection.

The device may further comprise an audio unit configured to announce an input request and at least one option of the input request, a memory, and a display configured to display a input request and at least one option of an input request, wherein the control module is further configured to cause the audio unit to announce an input request and/or a current option of the contest and the control module is configured to store the selected option for the first input request in the memory after the determination of a positive selection as the first motion gesture and configured to advance to a second option upon the determination of a negative selection as the first motion gesture.

The voting device may further comprise a vibration unit configured to provide haptic feedback to the user, wherein the control module is further configured to cause the vibration unit to vibrate to prompt the user for a selection confirmation and a communication interface configured to transmit or receive an input request and option information.

The voting device may be a mobile phone or a portable computer.

In accordance with another embodiment, a computer readable medium tangibly embodies a program of instructions executable by a processor of a device to perform an embodiment of the method for option selection.

BRIEF DESCRIPTION OF THE DRAWINGS

The option selection device and method is described with reference to the accompanying drawings which show preferred embodiments according to the device and method described herein. It will be noted that the device as disclosed in the accompanying drawings is illustrated by way of example only. The various elements and combinations of elements described below and illustrated in the drawings can be arranged and organized differently to result in embodiments which are still within the spirit and scope of the device described herein.

In addition, it should be understood that any figures that highlight any functionality and/or advantages, are presented for example purposes only. The disclosed architecture is sufficiently flexible and configurable, such that it may be utilized in ways other than that shown. For example, the steps listed in any flowchart may be re-ordered or only optionally used in some embodiments.

FIG. 4 shows an embodiment of the device and an up or down motion with respect to the y-axis.

FIG. 5 shows an embodiment of the device and a rotational motion about the x-axis.

DETAILED DESCRIPTION OF VARIOUS EMBODIMENTS

Embodiments of the present invention relate to a device and method for allowing visually impaired users to select from options shown on a display for an input request such as voting in an election or selecting an option in a survey. Through the use of motion gestures and auditory and/or haptic feedback, a user is able to select an option or multiple options shown on a display of a device without requiring the ability to view the options on the display. Thus, the embodiments described herein may be used in a variety of environments and situations. For example, the embodiments may be used in a low-light environment or with a disabled display to conserve the energy on a mobile device.

Figure 1:
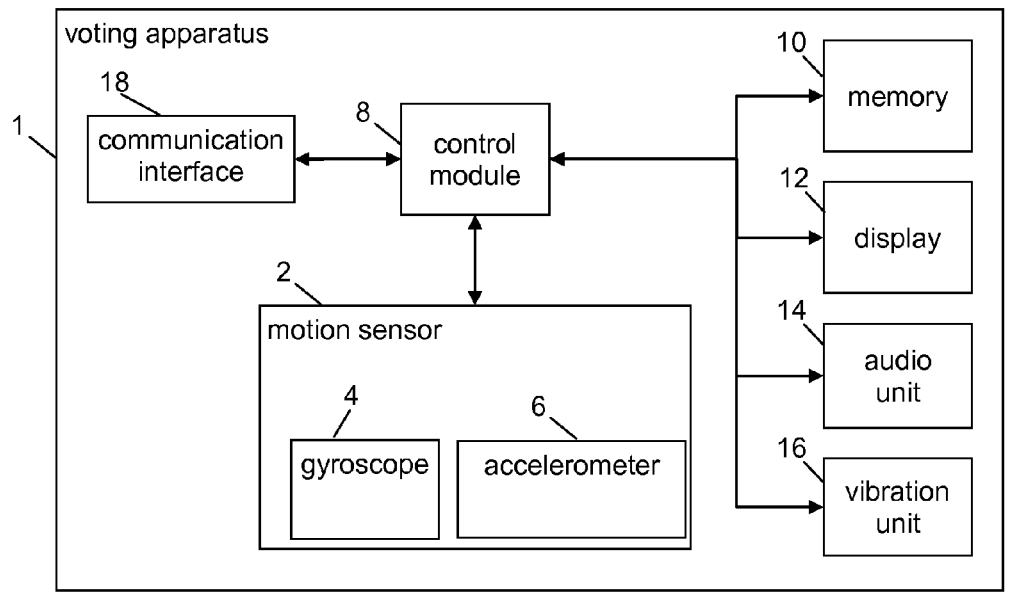
FIG. 1 shows an embodiment of the device.

FIG. 1 shows an embodiment of the voting device 1 including a motion sensor 2 having a gyroscope 4 and an accelerometer 6, a control module 8, a memory 10, a display 12, an audio unit 14, a vibration unit 16, and a communication interface 18. The control module 8 may be implemented in the form of a sequence of instructions executed on a processor of the device. The display 12 may be a touch sensitive display where the user is able to select items on a screen by touching the screen. The audio unit 14 may be speakers, and the communication interface 18 may be a wired communication interface or a wireless communication interface. An example of a voting device may be a mobile device such as a mobile phone, smartphone, personal digital assistant (PDA), or portable computer, or other handheld device.

Figure 2:
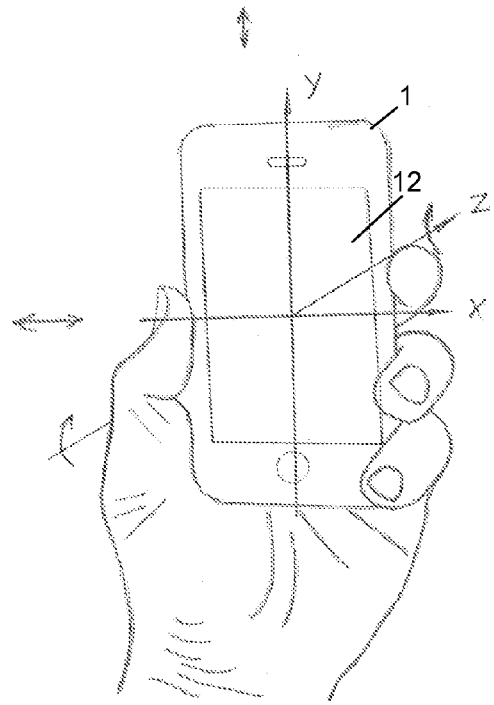
FIG. 2 shows an embodiment of the device with respect to three axes.

FIG. 2 shows the voting device 1 with respect to three motion axes. The x-axis is the direction from left to right of the device, and the y-axis is the vertical axis. The z-axis is the direction perpendicular to the plane formed by the x-axis and the y-axis. The motion sensor 2 of the voting device 1 is able to sense linear motion and rotational motion along each of the three motion axes.

Figure 3:
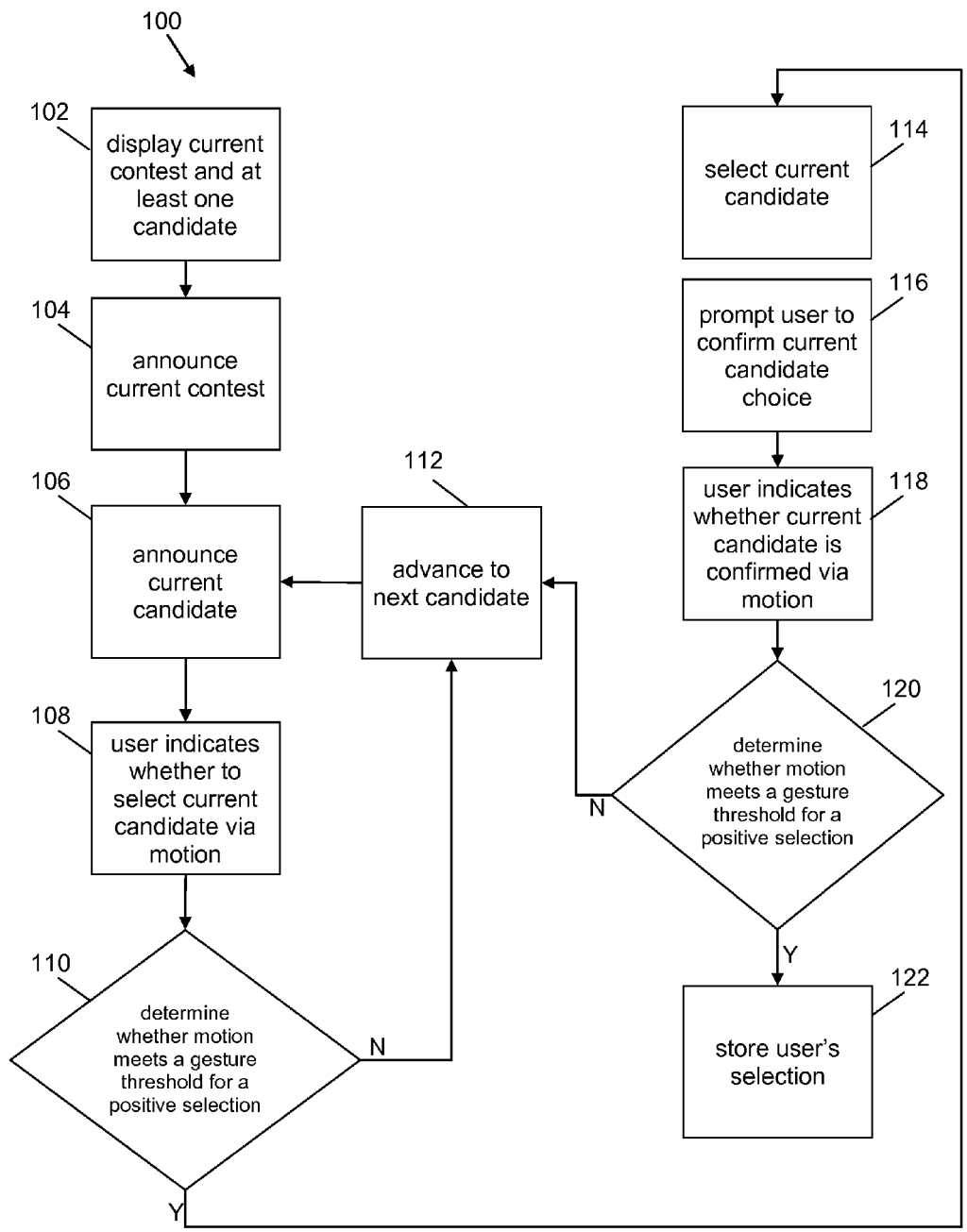
FIG. 3 is a flowchart of an embodiment of the method of voting.

An embodiment of the method of voting 100 is shown in FIG. 3. The voting device 1 may receive a ballot through the communication interface 18 containing at least one contest and at least one candidate for the at least one contest. The voting device 1 designates a contest from an election ballot and the candidates of the first contest as a current contest and displays the contest and/or candidates on the display 12 of the voting device 1 at 102. An example of the items displayed is shown in FIG. 4. On the display 12 in FIG. 4, four candidates are shown for the first contest designated as Candidate A, Candidate B, Candidate C, and Candidate D.

Returning to the method 100, the voting device 1 through the audio unit 14 audibly announces the current contest at 104 and one or more of the candidates for the current contest at 106. In response to the announcement, the user indicates whether or not to vote for the announced candidate. The voting device 1 enables the visually impaired user to indicate whether the user would like to vote for the current candidate, for example Candidate A, through a motion gesture associated with a positive selection or negative selection for the current candidate at 108. A positive selection indicates a "Yes" response in that the user would like to vote for the current candidate. A negative selection indicates a "No" response in that the user does not wish to vote for the current candidate.

The motion sensor 2 detects the motion including the acceleration and direction of the motion and sends this information to the control module 8. The control module 8 monitors and records the acceleration and direction of the motion and compares the recorded motion to a threshold for a motion gesture associated with a positive or negative selection at 110.

If the recorded motion satisfies the threshold for a particular motion gesture associated with a positive selection, the control module 8 considers the motion to be a positive selection of the current candidate. Alternatively, if the recorded motion satisfies the threshold for motion gesture associated with a negative selection, the control module 8 considers the motion to be a negative selection of the current candidate.

If the user fails to respond within a predetermined time period or does not select the current candidate, the control module 8 advances to the next candidate, for example Candidate B, at 112 and causes the audio unit 14 to announce the next candidate. The user is able to indicate through a motion gesture whether the user positively or negatively selects the current candidate. The voting device 1 repeats 106, 108, 110, and 112 until the user positively selects a candidate for the current contest.

Once the control module 8 has determined that the motion gesture meets a threshold for a positive selection, the current candidate is selected at 114. To indicate a positive selection, the selected candidate may be visibly highlighted on the display 12 and the voting device 1 may vibrate. In an embodiment of the method 100, the control module 8 may prompt the user to confirm the current selection at 116. To inform the user that a confirmation of the selection is required, the voting device 1 sends an audio signal or a haptic signal to the user. A pop-up window may also appear on the screen asking for a confirmation. The user indicates whether or not to confirm the current selection using a motion gesture associated with a positive selection or a negative selection. Similar to 110, the motion sensor 2 detects the motion and rotation around the x-axis, y-axis, and z-axis in space. The control module 8 records the motion and determines whether or not the recorded motion meets a threshold for a positive selection or a negative selection at 120. If the control module 8 determines that a positive confirmation has occurred, the voting device 1 stores the user's selected candidate for the current contest in the memory of the voting device 1 at 122. The user's selected candidate may be transmitted through the communication interface 18 of the voting device 1 over a network to a voting center.

If there are additional contests, the control module 8 provides the next contest and the candidates for the next contest, and the user is able to select a candidate for the next contest using the method 100.

The method of voting 100 is described herein with respect to a contest with two candidates. A skilled person would understand that the method described herein may be applied to a ballot having one or more contests and a contest having one or more candidates.

With respect to the motion gestures associated with the positive selection or negative selection, the motion gestures may be a linear motion, for example a shaking motion, or a rotational motion or any combination thereof. A first set of motion gestures may be assigned for an initial positive or negative selection of the current candidate, and a second set of motion gestures which may be different than the first set may be assigned for the confirmation of the initial selection.

Figure 6:
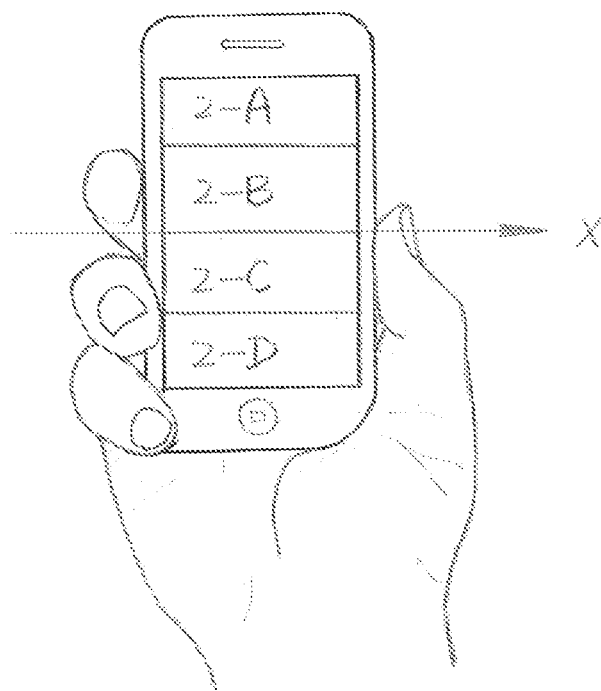
FIG. 6 shows an embodiment of the device and a translational motion along the x-axis.
Figure 7:
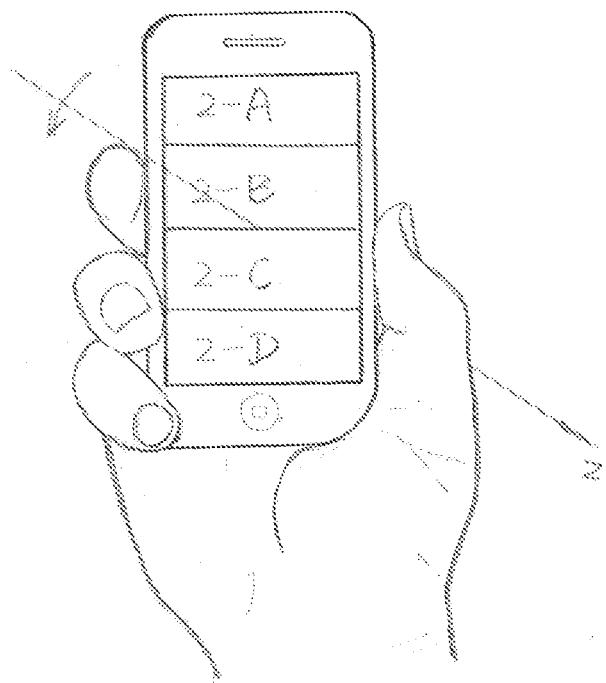
FIG. 7 shows an embodiment of the device and a rotational motion around the z-axis.

As an example, for a first set of motion gestures, a positive selection may be a vertical motion along the y-axis as shown in FIG. 4 and a negative selection may be a horizontal motion along the x-axis shown in FIG. 6. In confirming the initial selection, a second set of motion gestures may be associated with a positive selection and a negative selection. A positive confirmation may be a horizontal motion along the x-axis as shown in FIG. 6 in combination with a rotational motion around the z-axis as shown in FIG. 7, and a negative confirmation may be a vertical motion along the y-axis as shown in FIG. 4 in combination with a rotational motion around the x-axis as shown in FIG. 5.

A skilled person would understand that different combinations of a linear motion and/or a rotational motion may be used for the different sets of motion gestures.

The details with respect to the determination of the motion gesture and whether the motion gesture meets an associated threshold will now be described.

The motion of the voting device 1 may be recorded using motion control software executed by a processor of a voting device 1. Through a substantial motion recognition program, the motion software converts the motions into a textual record of the selections. Then, the textual records are presented on a display in real-time. If desired, the textual records can also be translated into another language by a translation program in real-time to improve the understanding of the user.

The software executed as, for example, the control module 8 reads the data stream of a motion received from the motion sensor. For example, based on motions, a system automatically generates motion recognizers using machine learning language to recognize a motion gesture. A left and right motion of the device along the x-axis as shown in FIG. 6 may indicate a negative selection, and a vertical, linear motion as shown in FIG. 4 may indicate a positive selection; the user may also provide responses as audio feedback (short sounds or vocal messages). The sensor produces signals of movements detected by the motion sensor which may include an accelerometer and/or a gyroscope.

In the embodiment of the voting device 1 having an accelerometer and gyroscope, the orientation may be given by the following values:

1. Azimuth is the rotation around the z-axis and is given as the angle between the phone's current position and the x-axis in the range of 0≤azimuth≤360.
2. Pitch is the rotation around the x-axis and is given as the angle between the phone's current position and the y-axis in the range of −180≤pitch≤180.
3. Roll is the rotation around the y-axis and is given as the angle between the phone's current position and the x-axis in the range of −90≤roll≤90.

In order to determine whether a user is performing a motion gesture such as a shaking gesture, both the acceleration and the direction of the motion must be determined.

The acceleration along the x-axis, the y-axis, and the z-axis are denoted as Ax, Ay, and Az, respectively. In calculating the acceleration for the motion gesture, the acceleration due to gravity must also be taken into account. The constant of gravity is denoted as g≈9.8 m/s².

When the phone is held in a stationary position, an upward force is applied to the phone by the hand of the user which is equal and opposite to gravity. During a motion gesture such as a shaking motion, the shaking of the phone is entirely caused by the forces applied to the phone by the hand of the user.

Gravity relative to the mobile coordinate direction and the cosine of the angles can be expressed as:

Angle with the x-axis:

$$\cos\alpha = \frac{g_x}{\sqrt{g_x^2 + g_y^2 + g_z^2}} = \frac{g_x}{g}$$

Angle with the y-axis:

$$\cos\beta = \frac{g_y}{\sqrt{g_x^2 + g_y^2 + g_z^2}} = \frac{g_y}{g}$$

Angle with the z-axis:

$$\cos\gamma = \frac{g_z}{\sqrt{g_x^2 + g_y^2 + g_z^2}} = \frac{g_z}{g}$$

Figure 8A:
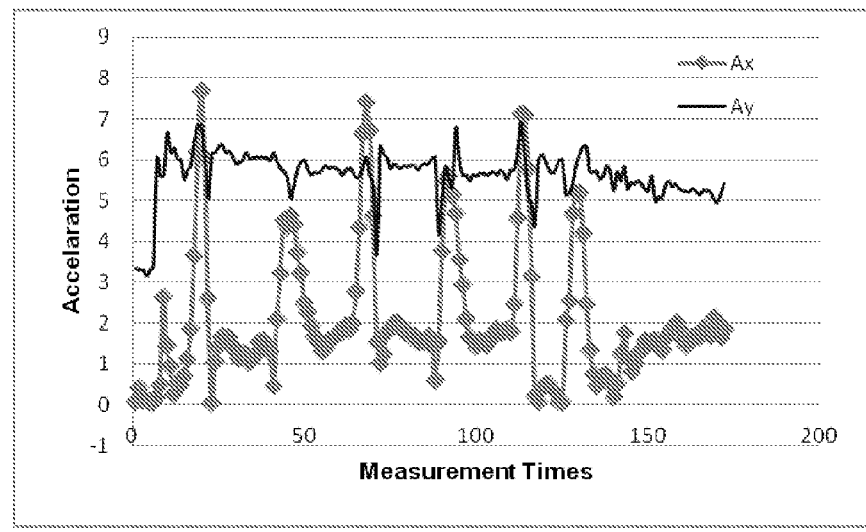
FIG. 8A shows an example of the data captured from the motion sensor for a "YES" motion.
Figure 8B:
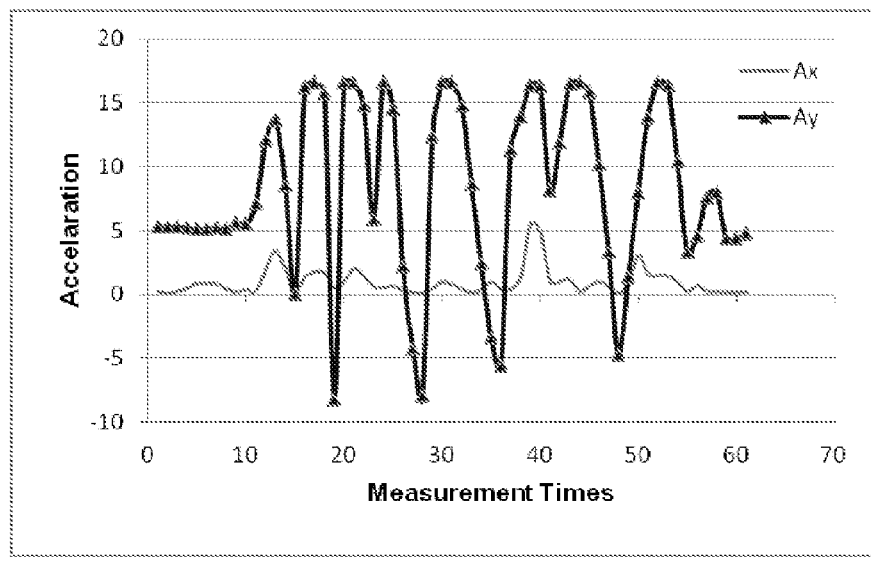
FIG. 8B shows an example of the data captured from the motion sensor for a "NO" motion.

The accelerometer and gyroscope of the motion sensor detects motion in three dimensions and are high performance sensors with an analog output. A processor of the voting device 1 converts the output signal of the accelerometer and gyroscope into a digital output signal. For the motion gesture of "YES" shown in FIG. 4 and "NO" shown in FIG. 6, data was collected of each motion gesture. For each gesture, the processor records six plots in the time domain of the linear acceleration (Ax, Ay, Az) along and rate of rotation or angular velocity (Gx, Gy, Gz) around each axis. An example of the original data from the motion sensor is shown in FIG. 8A for "YES" and FIG. 8B for "NO."

In order to get a real-time model, a fast Fourier transform (FFT) is used for frequency domain processing and spectrum analysis. In digital signal processing, a computationally efficient discrete Fourier transform (DFT) is preferred. An FFT algorithm is applied to each of the linear acceleration (Ax, Ay, Az) and angular velocity (Gx, Gy, Gz) of each axis which is shown in FIG. 9.

The Baum-Welch algorithm is applied to the FFT of each acceleration and angular velocity to obtain recovery parameters 1-30 for each motion. The Baum-Welch algorithm is described in more detail in L. E. Baum, T. Petrie, G. Soules, and N. Weiss, "A maximization technique occurring in the statistical analysis of probabilistic functions of Markov chains" published in The Annals of Mathematical Statistics, Vol. 41, No. 1, pp. 164-171, 1970 and Lloyd R. Welch, "Hidden Markov Models and the Baum-Welch Algorithm" published in the IEEE Information Theory Society Newsletter, Vol. 53, No. 4, pp. 1, 10-13, December 2003.

Figure 9:
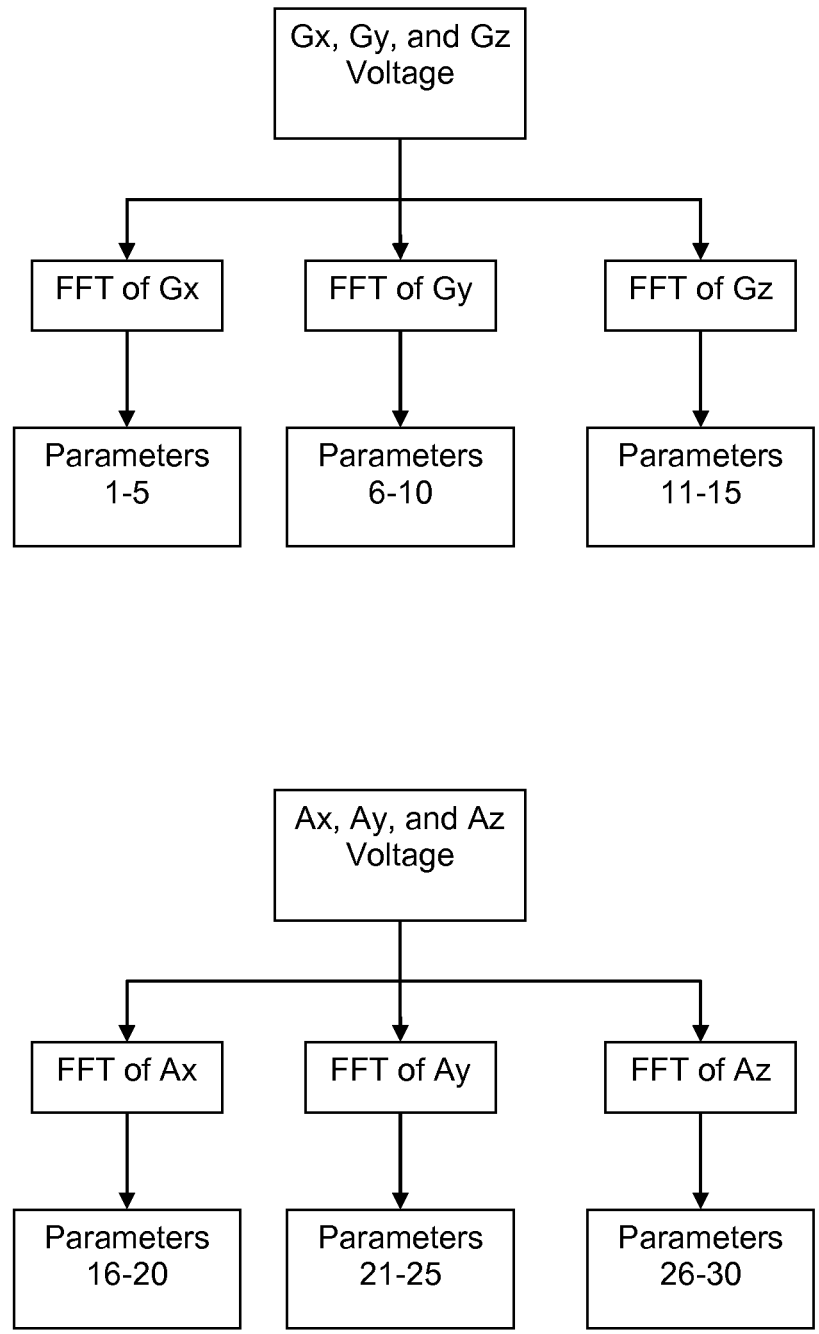
FIG. 9 shows a flowchart for motion gesture determination.

As shown in FIG. 9, five parameters are associated with each acceleration (Ax, Ay, Az) and angular velocity (Gx, Gy, Gz) which are arranged in a 6×5 matrix in sequence order. If the recovery parameters obtained through the Baum-Welch Algorithm locate at a "YES" matrix, the voter has chosen "YES," and if the recovery parameters locate at a "NO" matrix, the voter has chosen "NO" for the current option.

Figure 10:
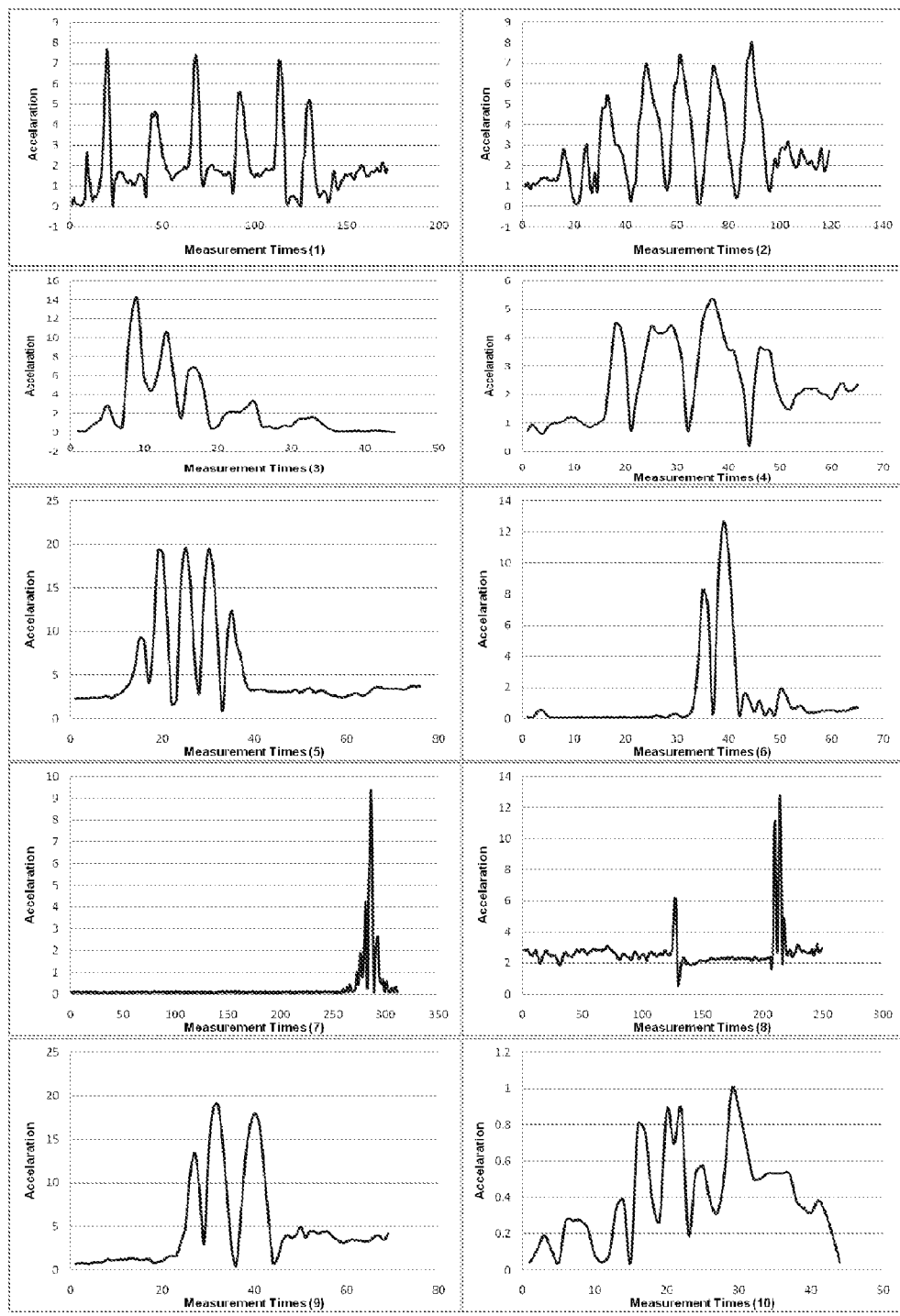
FIG. 10 shows graphs of ten samples of a shaking motion.

FIG. 10 shows the time domain signal of the linear acceleration along the x-axis (Ax) of a "YES" motion. Ten samples of a shaking motion are taken to obtain the data shown in FIG. 10. Based on FFT, a high frequency parameter in these results can be determined.

The motion gesture is described herein with respect to a shaking motion. A skilled person would understand that other motions such as a rotational motion may be used as the motion gesture or a combination of different motions.

Although this invention has been disclosed in the context of certain exemplary embodiments and examples, it will be understood by those skilled in the art that the present invention extends beyond the specifically disclosed embodiments to other alternative embodiments and/or uses of the invention and obvious modifications and equivalents thereof. Thus, it is intended that the scope of the present invention herein disclosed should not be limited by the particular disclosed embodiments described above. In particular, it should be noted that, for example purposes, the above explanation has focused on the example of voting for candidates on an election ballot. However, one skilled in the art will recognize that embodiments of the invention could, for example, be implemented in various other situations requesting user input in response to a user input request such as for selecting among choices in a survey.

For example, a skilled person would also understand that the embodiments of the apparatus and method described herein may be similarly used in a survey selection system with a question or opinion input request replacing the contest and the survey options replacing the candidates. The embodiments of the apparatus and method described herein may also be used by service personnel in a polling place to silently respond to urgent tickets generated by the system through a motion gesture without disturbing voters. The embodiments may further be used in an environment having a limited space where the user cannot raise his or her arm to key in the verified quantity and easily speak into the microphone. In this instance, the user may shake the portable device to enter a command into the device.

A skilled person would also understand that voting device may have an image sensor, and the motion gesture may be input into the voting device through the image sensor. The image sensor may send the image data to the control module which tracks the movement of the user to determine the motion gesture.

Many of the elements described in the disclosed embodiments may be implemented as modules. A module is defined here as an isolatable element that performs a defined function and has a defined interface to other elements. The modules described in this disclosure may be implemented in hardware, a combination of hardware and software, firmware, or a combination thereof, all of which are behaviorally equivalent. For example, modules may be implemented using computer hardware in combination with software routine(s) written in a computer language (such as C, C++, Fortran, Java, Basic, Matlab or the like). Additionally, it may be possible to implement modules using physical hardware that incorporates discrete or programmable analog, digital and/or quantum hardware. Examples of programmable hardware include: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. Finally, it needs to be emphasized that the above mentioned technologies may be used in combination to achieve the result of a functional module.

The software may be embodied on a computer readable medium which when executed by a processor of a computer perform a sequence of steps. A computer readable medium may be, for example a floppy disk, a flexible disk, a hard disk, magnetic tape, or any other magnetic medium, a CD-ROM, any other optical medium, a RAM, a ROM, or any other medium from which a computer can read. Various forms of computer readable media may be involved in carrying one or more sequences of one or more instructions to a processor for execution.

The invention claimed is:

1. A method, comprising:
   audibly announcing all textual content displayed on a display of a mobile device, by the mobile device, including a first input request and at least one option of the first input request;
   upon audibly announcing a first option of the first input request, detecting motion of the mobile device as a first motion gesture;
   capturing linear accelerations and angular velocities of the mobile device along at least two different axes for the first motion gesture;
   applying a fast Fourier transform to each of the linear accelerations and the angular velocities;
   applying a Baum-Welch algorithm to the fast Fourier transform of each of the linear accelerations and the angular velocities;
   obtaining only five recovery parameters for each of the linear accelerations and the angular velocities from the application of the Baum-Welch algorithm;
   determining, by the mobile device, whether the first motion gesture corresponds to a first positive motion gesture or a first negative motion gesture by determining whether the first motion gesture meets a first motion threshold for the first positive motion gesture or a second motion threshold for the first negative motion gesture based on the obtained recovery parameters;
   in response to determining that the first motion gesture corresponds to the first positive motion gesture, initially selecting the first option as a response to the first input request, providing a user with at least one of auditory feedback and haptic feedback indicating that the first option has been initially selected, and prompting the user via the feedback to use a second motion gesture to confirm the initial selection of the first option as the response to the first input request, wherein the second motion gesture is a different type of motion gesture than the first motion gesture;
   detecting motion of the mobile device in response to the prompt as the second motion gesture;
   determining whether the second motion gesture corresponds to a second positive motion gesture or a second negative motion gesture by determining whether the second motion gesture meets a third motion threshold for the second positive motion gesture different than the first motion threshold or a fourth motion threshold for the second negative motion gesture different than the second motion threshold; and
   in response to determining that the second motion gesture corresponds to the second positive motion gesture, selecting the first option as the response to the first input request, and storing the first option as the response to the first input request in a memory of the mobile device;
   in response to determining that the first motion gesture corresponds to the first negative motion gesture, advancing to a second option and audibly announcing the second option.

2. The method according to claim 1, further comprising:
   in response to determining that the second motion gesture corresponds to the second positive motion gesture, advancing to a second input request, audibly announcing the second input request and at least one option of the second input request, and detecting for a third motion gesture.

3. The method according to claim 1,
   wherein the first motion gesture comprises a rotational motion of the mobile device and the second motion gesture comprises a linear motion of the mobile device.

4. The method according to claim 1, wherein the first motion gesture comprises a linear motion having a first direction along a first axis and a second direction opposite to the first direction and the second motion gesture comprises a combination of the linear motion and a rotational motion around a second axis perpendicular to a plane of the mobile device.

5. The method according to claim 1, further comprising:
receiving input request and option information via a communication interface of the mobile device; and
transmitting the response to the first input request via the communication interface.

6. The method of claim 1, wherein detecting motion of the mobile device as a first motion gesture comprises:
detecting a linear motion comprising motion in a first direction and a second direction opposite the first direction along an axis in a plane of the mobile device as the first motion gesture, and
wherein detecting motion of the mobile device in response to the prompt as the second motion gesture comprises:
detecting a rotational motion of the mobile device around an axis perpendicular to a plane of the mobile device in response to the prompting as the second motion gesture.

7. The method of claim 6, wherein the first motion threshold corresponds to a motion along a vertical axis of the mobile device and the second motion threshold corresponds to a motion along a horizontal axis of the mobile device.

8. The method of claim 1, further comprising:
in response to failing to detect a positive motion gesture or a negative motion gesture within a predetermined time period starting after audibly announcing the first option of the first input request, audibly announcing a second option of the first input request and detecting for a third motion gesture.

9. The method of claim 1, wherein all information necessary to enable the user to provide responses and selections are provided as at least one of audible information or haptic feedback.

10. The method of claim 1, further comprising:
determining whether to initially select the first option of the first input request based only on the first motion gesture.

11. A mobile device, comprising:
a motion sensor configured to detect motion gestures;
an audio unit configured to announce an input request and at least one option of the input request;
a vibration unit configured to provide haptic feedback to a user by causing the vibration unit to vibrate to prompt the user for a selection confirmation;
a display configured to display input request information and at least one option of the input request;
a processor; and
a memory storing instructions that when executed by the processor cause the mobile device to:
audibly announce all content displayed on the display including a first input request and a first option of the first input request;
upon audibly announcing the first option of the first input request, cause the motion sensor to detect motion of the mobile device as a first motion gesture;
capture linear accelerations and angular velocities of the mobile device along at least two different axes of the first motion gesture;
apply a fast Fourier transform to each of the linear accelerations and the angular velocities;
apply a Baum-Welch algorithm to the fast Fourier transform of each of the linear accelerations and the angular velocities;
obtain only five recovery parameters for each of the linear accelerations and the angular velocities from the application of the Baum-Welch algorithm;
determine whether the first motion gesture corresponds to a first positive motion gesture or a first negative motion gesture by determining whether the first motion gesture meets a first motion threshold for the first positive motion gesture or a second motion threshold for the first negative motion gesture based on the obtained recovery parameters;
in response to determining that the first motion gesture corresponds to the first positive motion gesture, initially select the first option as a response to the first input request, provide the user with at least one of auditory feedback and haptic feedback indicating that the first option has been initially selected, and prompt the user via the feedback to use a second motion gesture to confirm the initial selection of the first option as the response to the first input request, wherein the second motion gesture is a different type of motion gesture than the first motion gesture;
cause the motion sensor to detect motion of the device in response to the prompt as the second motion gesture;
determine whether the second motion gesture corresponds to a second positive motion gesture or a second negative motion gesture by determining whether the second motion gesture meets a third motion threshold for the second positive motion gesture different than the first motion threshold or a fourth motion threshold for the second negative motion gesture different than the second motion threshold; and
in response to determining that the second motion gesture corresponds to the second positive motion gesture, select the first option as the response to the first input request and store the first option as the response to the first input request in the memory; and
in response to determining that the first motion gesture corresponds to the first negative motion gesture, advance to a second option and audibly announce the second option.

12. The device according to claim 11, further comprising: a communication interface configured to transmit or receive input request and option information.

13. The device according to claim 11, wherein the memory stores instructions that when executed by the processor cause the device to: in response to determining that the second motion gesture corresponds to the second positive motion gesture, advance to a second input request, cause the audio unit to audibly announce the second input request and at least one option of the second input request, and detect for a third motion gesture.

14. The device according to claim 11,
wherein the first motion gesture comprises a linear motion of the device and the second motion gesture comprises a rotational motion of the device, and
wherein the linear motion has a first direction along a first axis and a second direction opposite to the first direction and the rotational motion is around an axis perpendicular to a plane of the device.

15. The device of claim 11, wherein detect motion of the mobile device as a first motion gesture comprises:
detect a linear motion comprising motion in a first direction and a second direction opposite the first direction along an axis in a plane of the mobile device as the first motion gesture, and
wherein detect motion of the mobile device in response to the prompt as the second motion gesture comprises:
detect a rotational motion of the mobile device around an axis perpendicular to a plane of the mobile device in response to the prompting as the second motion gesture.

16. A non-transitory computer readable medium tangibly embodying a program of instructions executable by a processor to cause an apparatus to:

receive, via a communication interface of the apparatus, election ballot information including at least one contest and at least one candidate of the at least one contest;

audibly announce a first contest and at least one candidate of the first contest;

after audibly announcing the first contest and a first candidate of the first contest, detect a first motion gesture indicating a positive selection or a negative selection of the first candidate of the first contest;

capture linear accelerations and angular velocities of the apparatus along at least two different axes of the first motion gesture;

apply a fast Fourier transform to each of the linear accelerations and the angular velocities;

apply a Baum-Welch algorithm to the fast Fourier transform of each of the linear accelerations and the angular velocities;

obtain only five recovery parameters for each of the linear accelerations and the angular velocities from the application of the Baum-Welch algorithm;

determine whether the first motion gesture meets a first motion threshold for a first positive motion gesture or a second motion threshold for a first negative motion gesture based on the obtained recovery parameters;

in response to determining that the first motion gesture corresponds to the first positive motion gesture, initially cast a vote for the first candidate in the first contest, provide feedback indicating a preliminary selection of the first candidate as a recipient of the vote, and prompt, via at least one of auditory feedback and haptic feedback, a user to use a second motion gesture to confirm casting the vote for the first candidate, wherein the second motion gesture is a different type of motion gesture than the first motion gesture;

detect the second motion gesture in response to the prompt;

determine whether the second motion gesture corresponds to a second positive motion gesture or a second negative motion gesture by determining whether the second motion gesture meets a third motion threshold for the second positive motion gesture different than the first motion threshold or a fourth motion threshold for the second negative motion gesture different than the second motion threshold;

in response to determining that the second motion gesture corresponds to the second positive motion gesture, storing the first candidate as the recipient of the vote for the first contest; and transmitting, via the communication interface, the stored vote for the at least one contest.

* * * * *

UNITED STATES PATENT AND TRADEMARK OFFICE
CERTIFICATE OF CORRECTION

PATENT NO.         : 8,949,745 B2                                  Page 1 of 1
APPLICATION NO.    : 13/449782
DATED              : February 3, 2015
INVENTOR(S)        : Eugene Yu et al.

It is certified that error appears in the above-identified patent and that said Letters Patent is hereby corrected as shown below:

On the Title Page; Item (73) Under the Assignee Section:
        Please delete "Konntech, Inc.," and insert -- Konnech Inc., --

Signed and Sealed this
First Day of December, 2015

Michelle K. Lee
*Director of the United States Patent and Trademark Office*